(12) United States Patent
Pezzimenti et al.

(10) Patent No.: US 9,909,297 B2
(45) Date of Patent: Mar. 6, 2018

(54) APPARATUS AND METHOD FOR SEPARATING A LIQUID FROM OTHER SUBSTANCES

(71) Applicant: Tec-Kon Enterprises, LLC, Lockport, NY (US)

(72) Inventors: Dino Pezzimenti, North Chili, NY (US); Paul Rowe, Fairport, NY (US); Aaron Rowe, Fairport, NY (US); Raymond Cich, Clarence, NY (US)

(73) Assignee: Tec-Kon Enterprises, LLC, Lockport, NY (US)

( * ) Notice: Subject to any disclaimer, the term of this patent is extended or adjusted under 35 U.S.C. 154(b) by 0 days.

(21) Appl. No.: 14/976,014

(22) Filed: Dec. 21, 2015

(65) Prior Publication Data

US 2016/0102452 A1    Apr. 14, 2016

Related U.S. Application Data

(63) Continuation-in-part of application No. 13/865,842, filed on Apr. 18, 2013, now abandoned.

(51) Int. Cl.
| | |
|---|---|
| *E03F 5/14* | (2006.01) |
| *B01D 21/02* | (2006.01) |
| *B01D 21/24* | (2006.01) |
| *E03F 1/00* | (2006.01) |
| *B01D 21/00* | (2006.01) |
| *B01D 21/30* | (2006.01) |

(52) U.S. Cl.
CPC .............. *E03F 1/00* (2013.01); *B01D 21/003* (2013.01); *B01D 21/0024* (2013.01); *B01D 21/0033* (2013.01); *B01D 21/2405* (2013.01); *B01D 21/307* (2013.01); *E03F 5/14* (2013.01); *B01D 2221/12* (2013.01)

(58) Field of Classification Search
CPC .............. B01D 21/003; B01D 21/0033; B01D 21/0024; B01D 21/0087; B01D 21/2405; B01D 21/307; B01D 2221/12; E03F 5/10; E03F 5/101; E03F 5/14
USPC ....... 210/747.2, 800, 801, 170.03, 254, 519, 210/521, 532.1, 538, 540
See application file for complete search history.

(56) References Cited

U.S. PATENT DOCUMENTS

| | | | | |
|---|---|---|---|---|
| 5,433,845 A | * | 7/1995 | Greene et al. | 210/170.03 |
| 5,746,911 A | * | 5/1998 | Pank | 210/170.03 |

(Continued)

*Primary Examiner* — Christopher Upton
(74) *Attorney, Agent, or Firm* — Woods Oviatt Gilman LLP; Katherine H. McGuire, Esq.

(57) ABSTRACT

An apparatus for separating a liquid from other substances comprises a first chamber; a second chamber; an inlet connected to the first chamber; an outlet connected to the second chamber; a bypass conduit passing from the inlet, through the first chamber, and into the second chamber; a passage between the first and second chambers and configured to allow the liquid to flow from the first chamber to the second chamber, the passage below the bypass conduit; wherein the bypass conduit comprises a first opening within the first chamber and a second opening in the second chamber; and wherein the bypass conduit is angled relative to a horizontal so that a lowest region of the second opening is higher, in relation to the horizontal, than a highest region of the first opening, such that liquid flow into the inlet, less than a treatment flow rate, flows entirely through the first opening.

20 Claims, 3 Drawing Sheets

(56) References Cited

U.S. PATENT DOCUMENTS

| | | | |
|---|---|---|---|
| 6,077,448 A * | 6/2000 | Tran-Quoc-Nam et al. | 210/521 |
| 6,547,962 B2 * | 4/2003 | Kistner et al. | 210/170.03 |
| 7,314,549 B2 * | 1/2008 | Swift | 210/170.03 |
| 2008/0217227 A1 * | 9/2008 | Pank | 210/170.03 |
| 2008/0251448 A1 * | 10/2008 | Kent | 210/170.03 |

* cited by examiner

APPARATUS AND METHOD FOR SEPARATING A LIQUID FROM OTHER SUBSTANCES

RELATED APPLICATION

This application claims priority to U.S. Non-Provisional patent application Ser. No. 13/865,842 filed on Apr. 18, 2013.

BACKGROUND OF THE INVENTION

The present invention relates generally to a storm water treatment system with specialty internal conduit. The present invention also relates generally to the treatment of waste streams (e.g., process or storm water runoff, etc.). More particularly the present invention relates to the removal of floatable and non-floatable matter therein so that cleaner liquid is returned to the process (e.g., environment).

Oil and grit separators, also known as hydrodynamic separators, are used to control hydrocarbon, floatable matter, and sediment loadings by removing them from a waste stream and containing them for future removal and disposal. Such a separator comprises a structure made totally of a durable material, usually concrete, or a combination of durable materials. It is accordingly an object of the present invention to provide a more efficient treatment apparatus and method for removing sediments, floatable debris, and hydrocarbons while limiting re-suspension and re-entrainment of previously captured material by bypassing higher flows (which may cause re-suspension and re-entrainment). It is also an object of the present invention to provide such an apparatus that is inexpensive, easy to operate (passive), and reliable. As can be seen, there is a need for solutions to these and other problems.

SUMMARY OF THE INVENTION

In one aspect of the present invention, an apparatus for separating a liquid from other substances comprises a first chamber; a second chamber; an inlet connected to the first chamber; an outlet connected to the second chamber; a bypass conduit passing from the inlet, through the first chamber, and into the second chamber; a passage between the first and second chambers and configured to allow the liquid to flow from the first chamber to the second chamber, the passage located below the bypass conduit; wherein the bypass conduit comprises a first opening located within the first chamber and a second opening located in the second chamber; and wherein the bypass conduit is angled relative to a horizontal so that a lowest region of the second opening is higher, in relation to the horizontal, than a highest region of the first opening, such that liquid flow into the inlet, less than a treatment flow rate, flows substantially entirely through the first opening.

The second opening may comprise a notch in the bypass conduit, the notch having a height relative to a bottom surface of the bypass conduit and a width relative to an end of the bypass conduit. The bypass conduit may be angled relative to a horizontal such that a substantial portion of liquid flow into the inlet, above the treatment flow rate, flows through the second opening into the second chamber. The first opening may comprise a slot in the bypass conduit that has an area sufficient to allow a treatment flow rate of the liquid to substantially entirely flow through the first opening. The first opening may define a scoop in the bypass conduit shaped and configured to direct liquid flow from the inlet into the first chamber. The bypass conduit may comprise a third opening located within the first chamber at a height approximately corresponding to a height of the second opening. The inlet, the bypass conduit, and the first and second openings are integrally formed.

In another aspect of the present invention, an apparatus for separating a liquid from other substances comprises a first chamber; a second chamber; an inlet connected to the first chamber; an outlet connected to the second chamber; a bypass conduit passing from the inlet, through the first chamber, and into the second chamber; a passage between the first and second chambers and configured to allow the liquid to flow from the first chamber to the second chamber, the passage located below the bypass conduit, wherein the bypass conduit comprises a first opening located within the first chamber and a second opening located in the second chamber, wherein the second opening comprises a notch in the bypass conduit, the notch having a height relative to a bottom surface of the bypass conduit and a width relative to an end of the bypass conduit, wherein the bypass conduit is angled at an angle relative to a horizontal so that a lowest region of the notch is higher, in relation to the horizontal, than a highest region of the first opening, such that liquid flow into the inlet, less than a treatment flow rate, flows substantially entirely through the first opening, and wherein the first opening comprises a slot in the bypass conduit having an area sufficient to allow liquid flow into the inlet, less than the treatment flow rate, to substantially entirely flow through the first opening.

A method of separating a liquid from other substances that comprises providing the apparatus as explained above may also be an aspect of the invention. This method provides a mixture of the liquid and other substances into the inlet and provides for directing the liquid from the outlet. The method may comprise adjusting the angle of the bypass conduit to adjust the treatment flow rate. The method may also comprise adjusting at least one of the height and the width of the notch to adjust the treatment flow rate. The method may also comprise adjusting the angle of the bypass conduit and the height and the width of the notch to adjust the treatment flow rate.

In another aspect of the present invention, an apparatus for separating floating and non-floating matter from liquid and for separating liquids from liquids with a different density comprises one or more structures divided such that the apparatus comprises a plurality of internal chambers; at least one inlet conduit that passes all the way through at least one chamber, but not all chambers, and terminates within one of the chambers, the conduit having at least one opening in each of the internal chambers; a passageway between the internal chambers below the conduit to simultaneously allow liquid to pass between the internal chambers and to prevent floatable matter from passing between chambers; and the first opening in the first internal chamber for the passage of liquid out of the conduit, first opening comprising a shape that wraps generally around the bottom and sides of the conduit but not the top and the first opening is shorter, relative to the axis of the conduit, at the bottom than on the sides so as to allow flow to exit the conduit in all horizontal and downward directions, but minimizing the average downward component of the velocity of this flow.

The terminal end of the conduit may be sealed and some length of the top portion of the sealed end of the conduit is removed to create a second opening and a check dam regulator. Floating matter in the conduit may be purged through the flushing action of incoming liquid prior to the openings becoming hydraulically locked. The first opening may be cut into the conduit adjacent to, but in the first internal chamber and upstream of a second opening comprising a check dam regulator, the top of the first opening may be set below the elevation of the second opening and the check dam regulator for purging of floatable matter trapped within the conduit prior to liquid level rising above the top of the second opening and the check dam regulator. The conduit may take on a rising slope while inside the internal chambers so as to raise the elevation of a check dam regulator without raising the check dam regulator relative to the invert of the terminal end of the conduit. The conduit may utilize the Bernoulli Effect to balance the flow of the liquid between and through the first internal chamber and the inlet conduit. The first opening may be cut into the conduit in the first internal chamber and adjacent to a baffle wall, the top of the first opening may be set below the elevation of the second opening and the check dam regulator, wherein the first opening and all substantial openings upstream of the second opening are designed to hydraulically lock during flows sufficient to raise the liquid level within the conduit to the level of the second opening so as to prevent previously captured floatable matter from escaping from the first internal chamber. The elevation of the second opening and the combined hydraulic loss of the first opening may be balanced such that at a specified treatment flow rate the liquid level in the conduit reaches the elevation of the second opening and liquid exits the conduit through the second opening at any higher flow rate, but not at a lower flow rate.

In another aspect of the present invention, an apparatus for separating a liquid from other substances comprises a first chamber; a second chamber separated from the first chamber by a baffle wall; the baffle wall comprising a horizontal slab; an inlet connected to the first chamber; an outlet connected to the second chamber; a bypass conduit passing from the inlet, through the first chamber, and into the second chamber; a passage configured to allow the liquid to flow from the first chamber to the second chamber, the passage located beneath the horizontal slab; and wherein the bypass conduit comprises a first opening located within the first chamber, adjacent to the baffle wall, and a second opening located in the second chamber. The bypass conduit may be horizontal such that the second opening and the check dam regulator is at an equal elevation to the inlet conduit. The second opening may comprise a check dam regulator, the top of the first opening set below the elevation of the second opening and the check dam regulator for purging of floatable matter trapped within the conduit prior to liquid level rising above the top of the second opening and the check dam regulator. A shelf in the second chamber may be installed to minimize turbulence and promote mixing of the flow of liquid.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Figure 1:
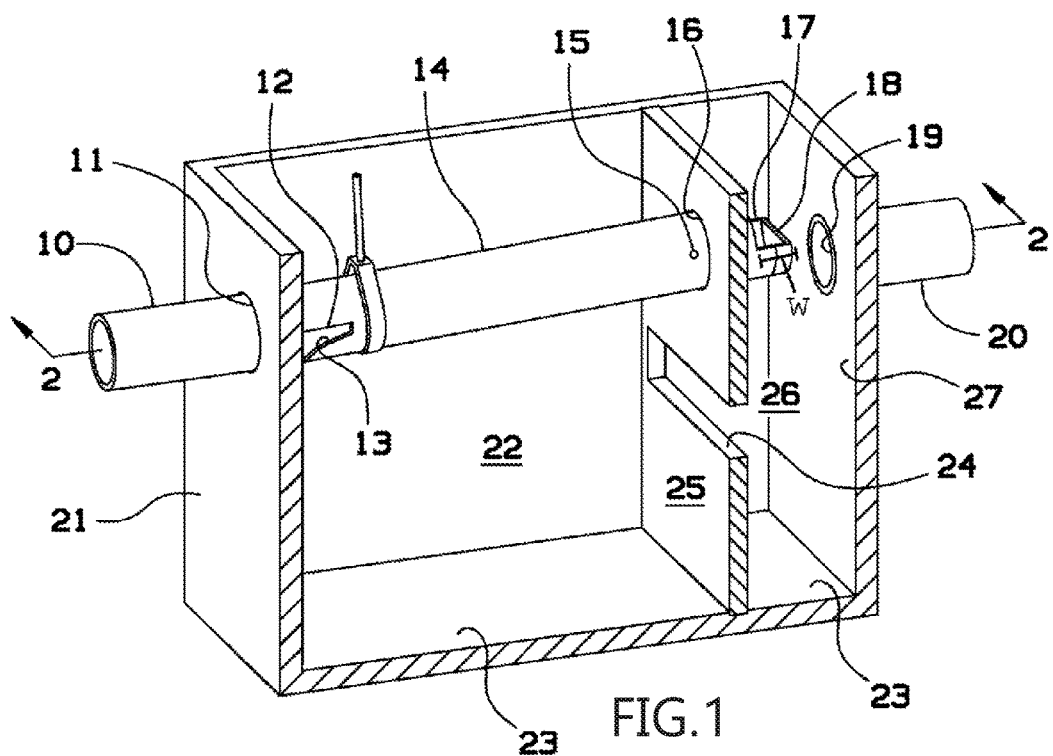
FIG. 1: is a cutaway perspective view of one embodiment of the invention.
Figure 2:
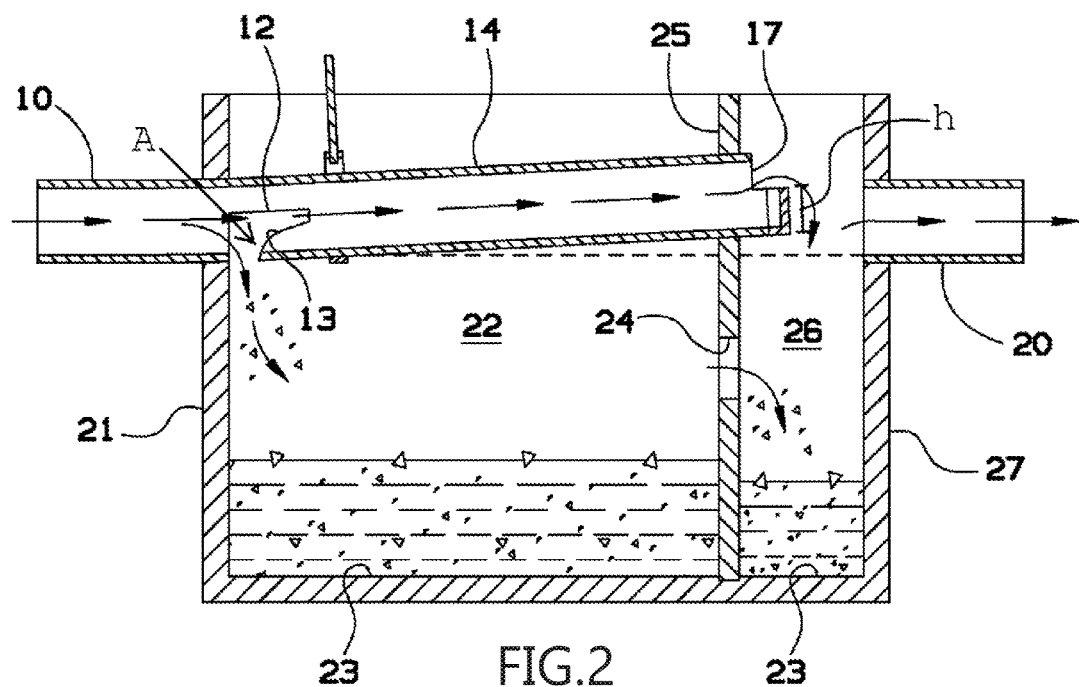
FIG. 2: is a section view of one embodiment of the invention taken along line 2-2 in FIG. 1.

Referring now to the FIGS. 1 and 2, an apparatus for treating liquid such as stormwater or other flows from industrial, commercial, and urban applications is disclosed. The liquid is treated by removing non-floatable matter such as sediment (sand, silt, clays) hydrocarbon-laden sediment, debris, nutrients, heavy metals, as well as gross floatable matter such as hydrocarbons, organic matter, and litter. The contaminated liquid is received through the inlet conduit 10 (e.g., pipe) through an opening 11 in the side wall 21 of the structure, and the treated liquid is discharged through the outlet conduit(s) 20 through an opening in the opposite wall 27 for return to the process (environment) or as otherwise desired.

Immediately upon entering the apparatus, the inlet conduit 10 is attached to (and/or becomes) the bypass conduit 14, which may be integrally formed with the inlet conduit 10. The bypass conduit 14 continues through the treatment/holding chamber 22, passes through an opening 16 in the baffle wall 25, and terminates in the confluence chamber 26 with a check dam regulator 18 on the outlet end of the conduit. The inlet conduit 10, bypass conduit 14 and the outlet conduit 20, as well as other conduits described in this specification, which may be composed of steel, plastic, or other suitable materials, may be suitably sealed and secured in the openings in their respective walls by grout, or other suitable means (e.g., flexible boots).

The first chamber, the treatment/holding chamber 22, is contained within a structure, that may be square or round and is composed of side wall(s) 21, 27, a floor 23, and a ceiling, suitably joined together and composed of suitable material such as, for example, high strength steel-reinforced corrosion-resistant precast concrete suitable for heavy traffic loading as required. The floor 23 may be a monolithic base section desirably providing anti-floatation of the structure. The structure may be, for example, but is not limited to, on the order of about 1.8 to 3.7 meters (6 to 12 feet) high and about, but is not limited to, 0.9 to 36.6 meters (3 to 120 feet) in inside dimension depending on the flow rate, on the order of about 2.8 to 10,620 liters per second (0.1 to 375 cubic feet per second) or higher, that the apparatus is capable of handling. The second chamber, called the confluence chamber 26, is generally contained within the same structure but may also be contained within a separate structure that may also be either round or square. The outlet conduit 20 may be sized (e.g., has a diameter) to handle the flow rate and thus would typically be sized equal approximately to the inlet conduit 10.

The bypass conduit 14 has various features with unique and interdependent hydraulic functions along its length. A few of these features are (a) the first opening 13, (b) the second opening 17, and (c) the check dam regulator 18.

(a) The first bypass conduit feature, the first opening 13 (which may also be known as a "butterfly orifice" in reference to its shape as viewed from a plan view), is cut or formed into the lower portion of the bypass conduit 14, adjacent to the side wall 21 and opening 11. The shape and size of the first opening 13 are engineered to eject the incoming fluid from the bypass conduit 14 with minimal hydraulic losses and an evenly diffused flow in all sideways directions while also minimizing the downward component of the flow velocity. This is to prevent a liquid stream from entering the treatment/holding chamber with enough force to disturb previously settled particles, even under high-flow conditions.

(b) The second bypass conduit feature, the second opening 17, is formed by cutting a notch into the end of the bypass conduit 14 within the confluence chamber 26. The shape and size of the second opening 17 is engineered to allow a sufficient volume of fluid to exit the bypass conduit 14 during bypass flows while helping to maintain the hydraulic head (pressure). The length of the second opening 17 is the component of the feature which determines the fraction of the flow that is bypassed under high-flow conditions.

(c) The third bypass conduit feature, the check dam regulator [18], is formed by securing a cap to the end of the bypass conduit [14]. The elevation of the check dam regulator 18, which may be the same elevation as the second opening 17, is the component of the feature that determines the hydraulic head used to drive flow through the first opening 13 and into the treatment/holding chamber 22.

Interdependence is had between the first opening 13, second opening 17, and check dam regulator 18 in that the head, required to force the desired treatment flow through the first opening 13, is directly provided by the elevation of the second opening 17 and the check dam regulator 18. It was discovered that some design scenarios can require a check dam regulator elevation that is higher than the bypass conduit is tall. The higher the second opening 17 and check dam regulator 18 elevation is formed relative to the invert of the conduit, the more restrictive the resulting opening. Therefore, the bypass conduit may be provided to have an upward tilt, as needed, to have any desired elevation relative to the first opening 13 while also maintaining a relatively low elevation relative the second opening 17 and the check dam regulator 18 of the bypass conduit 14. This design provides greater hydraulic pressure in the bypass conduit 14 without creating geometry in the second opening 17 and the check dam regulator 18 which may restrict the flow under high-flow conditions. Through careful hydraulic balancing of these features 13, 17, and 18, during low-flow and transition-flow conditions, the system treats all flow rates for floatable and non-floatable matter up to a specified "treatment" flow rate, and under high-flow rate conditions the unit continues to treat that specified "treatment" flow safely for non-floatable matter while allowing all superfluous flow to pass through harmlessly and return to the process (e.g., environment). This may be accomplished by taking advantage of the Bernoulli Effect. During flows that are equal to and less than the treatment flow rate, all flow goes through the first opening and into the first compartment. During flow conditions that are greater than the treatment flow rate (i.e. bypass), the hydraulic balancing of the three features implements the Bernoulli Effect to cause the flow from the first opening to be controlled within a range of flow rates such that, the flow rates never increase to a point that causes re-entrainment (stirring up) of previously-captured material due to excessive velocity coming from the first opening (hydraulic locking).

Additional interdependence may be had between the first opening 13, the second opening 17, and the check dam regulator 17 that deserves attention. The top 12 of the first opening 13 may be constrained to be slightly below the level of the second opening 17 and the check dam regulator 18 so as to permit all incoming floating matter to pass freely through the first opening 13 under low-flow conditions. Under transition-flow conditions and high-flow conditions, the liquid level in the treatment/holding chamber 22 rises above the top 12 of the first opening 13, creating a hydraulic lock to trap all floatable matter in the treatment/holding chamber 22 (similar in function to a check valve). Thus, under high-flow conditions, even the most vigorous bypass flow can pass through the unit without re-entraining any floatable matter from the treatment/holding chamber 22.

A transition purge opening 15 may be placed on the side of the bypass conduit 14 upstream of the baffle wall 25. During transition-flow conditions, the water level rises above the top 12 of the first opening 13 but has not reached the elevation of the check dam regulator. When the flow rises above the level of the first opening 13 some floating matter may remain trapped on the inside of the conduit water lock, described above. Under transitional flow conditions this floatable matter remains trapped behind the second opening 17 and check dam regulator 18 and is allowed to skim off the top and drain into the treatment/holding chamber through the transition purge opening 15. Thus, any trapped floatable matter trapped within the bypass conduit can be purged before reaching high-flow conditions when bypass flow passes over top of the second opening 17 and check dam regulator 18.

While liquid is entering into the apparatus (e.g., a storm event) during low flows, the liquid flows through the inlet conduit 10 into the bypass conduit. Some of the flow in the bypass conduit 10 makes a circuitous path past the first opening 13 (because of its incoming momentum) to the second opening 17 and check dam regulator 18. At that time the first opening 13, is not below the liquid surface elevation and floatable matter flows freely through the first opening 13 and into the treatment/holding chamber 22 via the effects of gravity, spreading uniformly across the width of the chamber 22 to achieve a long path length for the flow stream through the treatment/holding chamber 22. This allows the maximum amount of non-floatable matter to desirably be deposited out or dropped to the bottom of the treatment/holding chamber 22 and the floatable matter to rise and thereby become separated and trapped in the treatment/holding chamber 22. This effect can be explained with Stokes Law.

When the flow rate increases sufficiently, such that the liquid surface elevation rises above the top 12 of the first opening 13, the floatable matter stops flowing into the treatment/holding chamber 22. At this point, most floatable matter in the treatment/holding chamber 22 is then trapped in the treatment/holding chamber 22 (similar to the operation of a check valve). However, some floatable matter reintroduced into the bypass conduit 14 through the first opening 13 by the actions of buoyancy (explained through Stokes Law). The liquid in the bypass conduit 14, less the non-floatable matter and floatable matter trapped in the treatment/holding chamber 22, flows through the opening 16 of the baffle wall 25 and over the tops of the second opening 17 and the check dam regulator 18. Additional settling of non-floatable matter (e.g., fine material such as clay) may occur in the confluence chamber 26 if there is non-floatable matter remaining in the liquid. The liquid flowing from the first opening 13 towards the inlet end of the apparatus, changes direction and flows toward the outlet end of the apparatus from the treatment/holding chamber 22 through the flow control opening(s) 24 of the baffle wall 25 into the confluence chamber 26. Additional settling of non-floatable matter may occur in the confluence chamber 26 if there is non-floatable matter remaining in the liquid. The liquid transferred over the second opening 17 and check dam regulator 18 converges with the liquid transferred from the first opening 13. This combined liquid exits the apparatus through the outlet conduit 20. A shelf 31 may be employed (FIGS. 5 and 6) to minimize turbulence and promote mixing of the two converging flow streams.

The inlet conduit 10 and bypass conduit 14 are disposed to enter the treatment/holding chamber 22 horizontally to the treatment/holding chamber 22 and extending in through the treatment/holding chamber 22 and through the baffle wall 25 into the confluence chamber 26. The bypass conduit 14 may be sloped anywhere from 0° to 10° whereby the second opening 17 and check dam regulator 18, of the bypass conduit 14 is at an equal or higher elevation than the inlet conduit 10. The liquid is thus introduced into the treatment/holding chamber 22 from the bypass conduit 14 through the first opening 13. first opening 13 is specifically engineered for size and location to divert the liquid on a path that enhances removal of the non-floatable matter and the floatable matter, without causing re-suspension of the non-floatable matter or re-entrainment of the floatable matter. Part of the liquid may remain in the bypass conduit 14 during an event. This flow of this part of the liquid is stopped at the outlet end of the bypass conduit 14 by the check dam regulator 18. The second opening 17 and the check dam regulator 18, in concert with the first opening 13 and the baffle opening 24, regulate the liquid into the treatment/holding chamber 22 to a specified flow rate. Any excess liquid over the specified flow rate exits the bypass conduit 14 at the outlet end through the second opening 17. The second opening 17 and the check dam regulator 18 are specifically engineered for size and location.

In one aspect, a method of separating a liquid from other substances includes adjusting the angle of the bypass conduit to adjust the design flow, such as raising or lowering an end of the bypass conduit 14. In one aspect, the method comprises adjusting at least one of the height h and the width w of the notch to adjust the design flow. In one aspect, the method comprises adjusting the area A of the slot to adjust the design flow. In one aspect, the method comprises adjusting and/or balancing the angle of the bypass conduit and the height and the width of the notch to adjust the design flow.

Figure 3:
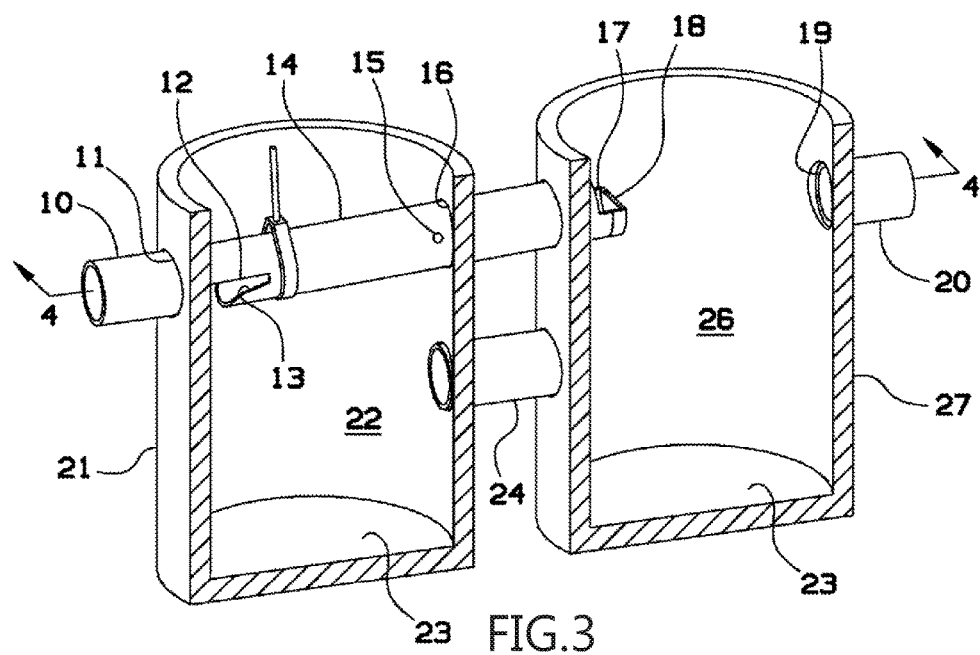
FIG. 3: is a cutaway perspective view of an alternate embodiment of the invention.
Figure 4:
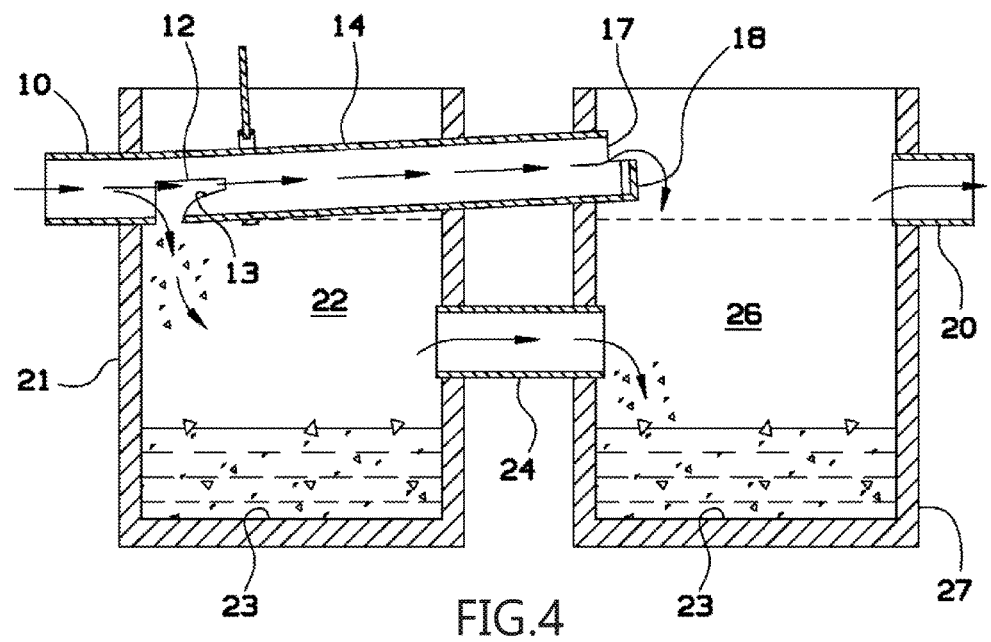
FIG. 4: is a section view of the alternate embodiment of the invention taken along line 4-4 in FIG. 3.

Referring now to FIGS. 3 and 4, there is shown generally an apparatus in accordance with an alternative embodiment of the present invention. This alternative embodiment implements two individual chambers and/or structures (housings) as opposed to using the single structure described in the embodiment shown in FIGS. 1 and 2. Similar to the single structure, the alternative embodiment includes the aforementioned components of the primary embodiment with the difference of the alternative embodiment including conduits 24 for passage of the treated liquid from the primary chamber 22 to the secondary chamber 26.

Figure 5:
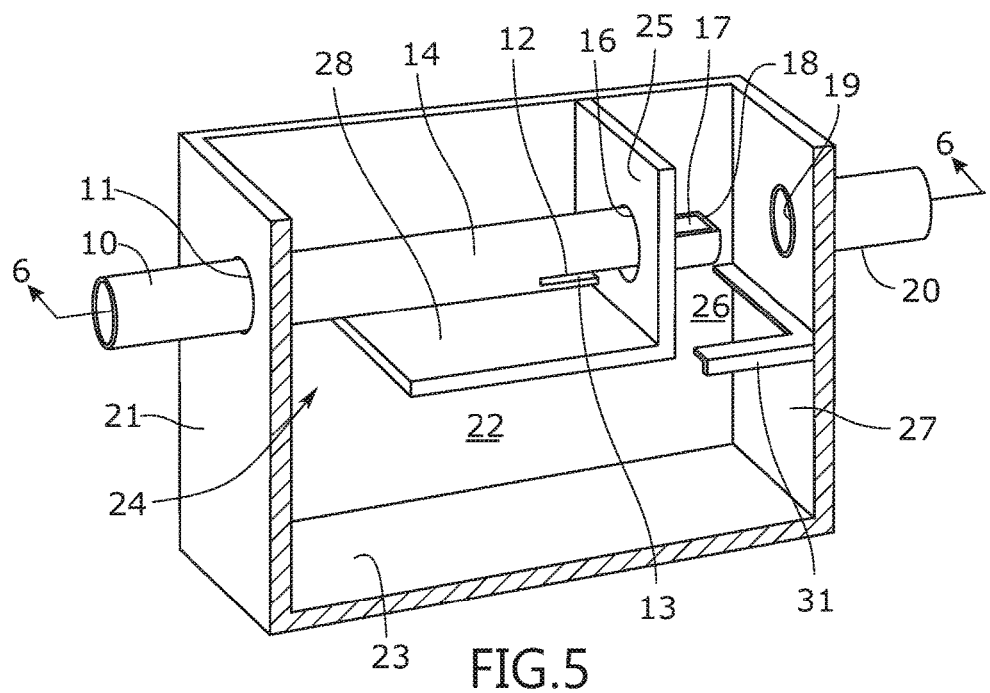
FIG. 5: is a cutaway perspective view of an alternate embodiment of the invention.
Figure 6:
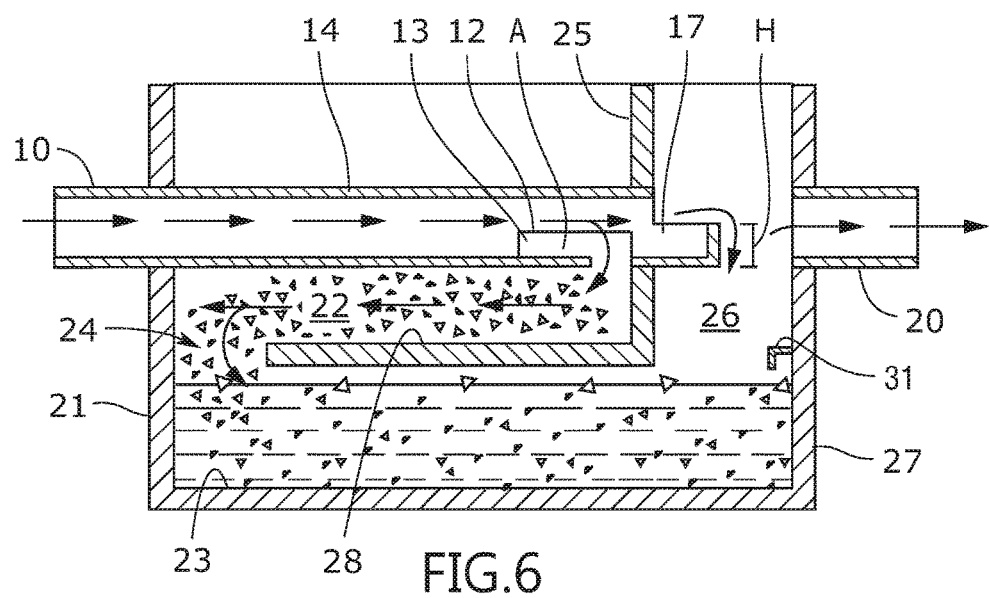
FIG. 6: is a section view of the alternate embodiment invention taken along line 5-5 in FIG. 5.

Referring now to FIGS. 5 and 6, there is shown generally an apparatus in accordance with another alternative embodiment of the present invention. This alternative embodiment implements a baffle wall 25 embodied to comprise a horizontal separation slab 28. The baffle opening 24 is the area below the horizontal slab 28 which connects the holding/treatment chamber with the confluence chamber 26. It was discovered that embodying the baffle wall 25 in this manner increases its surface area and allows for non-floatable matter to settle and easily get captured (improved surface overflow rate), which helps to generally increase the efficiency of the apparatus.

The first opening 13 is also adjacent to the opening 16 of the baffle wall 25. The inlet/bypass conduit 10, 14 is disposed to enter the treatment/holding chamber 22 horizontally to the treatment/holding chamber 22 and extending through the treatment/holding chamber 22 and through the baffle wall 25 into the confluence chamber 26. The bypass conduit 14 is horizontal (0° slope) whereby the second opening 17 and the check dam regulator 18 is at an equal elevation to the inlet conduit 10. The liquid is thus introduced into the treatment/holding chamber 22 from the bypass conduit 14 through the first opening 13. This embodiment of the first opening 13 is specifically engineered (as shown) for its size and location so as to divert the liquid on a path that enhances removal of the non-floatable matter and the floatable matter, without causing re-suspension of the non-floatable matter or re-entrainment of the floatable matter.

While liquid enters into the apparatus (e.g., a storm event) during low flows, the liquid flows through the inlet conduit 10 into the bypass conduit 14. Some of the flow in the bypass conduit 14 makes a circuitous path past the first opening 13 (because of its incoming momentum) to the check dam regulator 18 and back. At that time, the first opening 13 is not below the liquid surface elevation and the non-floatable matter flows freely through the first opening 13 and into the treatment/holding chamber 22. This allows the non-floatable matter to spread uniformly across the width of the horizontal slab 28 and the chamber 22 and to achieve a long path length for the flow stream through the treatment/holding chamber 22. This also allows the maximum amount of non-floatable matter to be deposited onto the horizontal slab 28. Over time, the liquid surface elevation at the bottom of the treatment/holding chamber 22 rises, causing the floatable matter to separate from the non-floatable matter and trap the non-floatable matter in the treatment/holding chamber 22. When the flow rate sufficiently increases, such that the liquid surface elevation rises above the top 12 of the first opening 13, the flow of floatable matter out of the first opening 13 and into the treatment/holding chamber 22 will stop. The floatable matter in the treatment/holding chamber 22 is then trapped in the treatment/holding chamber 22 similar to the operation of a check valve. The liquid in the bypass conduit 14, less the non-floatable matter and floatable matter trapped in the treatment/holding chamber 22, flows through the opening 16 of the baffle wall 25 and over the tops of both the second opening 17 and the check dam regulator 18. Additional settling of non-floatable matter may occur in the confluence chamber 26 if there is non-floatable matter remaining in the liquid there. As depicted by the arrows, the liquid flowing from the first opening 13 that flows past the horizontal slab 28 will in turn drop down into the baffle opening 24 region and subsequently flow toward the outlet end of the apparatus from the treatment/holding chamber 22 into the confluence chamber 26. The liquid transferred past the second opening 17 and the check dam regulator 18 converges with the liquid transferred from the first opening 13. A horizontal shelf 31 may be employed to minimize turbulence and promote mixing of the two converging flow streams. This combined liquid exits the apparatus through the outlet conduit 20.

Other embodiments of the present invention may be described as follows. The present invention may include an apparatus for separating floating and non-floating particulates from liquid wherein the apparatus includes a treatment/holding chamber for collecting non-floating and floating particulates and a confluence chamber where treated and overflow liquid combine and are discharged from the apparatus. A side-stream flow may be diverted to an ancillary chamber for additional treatment including, but not limited to high efficiency oil/water separation, nutrient removal, heavy metal removal, etc. An inlet/bypass conduit for introducing liquid into the apparatus is provided with an upward slope (i.e., the downstream end of the conduit is at a higher elevation than the upstream end of the same conduit) and passes through the treatment/holding chamber and a baffle wall into the confluence chamber. An first opening, is cut or formed in the inlet/bypass conduit adjacent to its entry point into the structure, usually prior to installation of the inlet/bypass conduit into the structure, to provide a laterally dispersed, low velocity flow of liquid from the inlet conduit, into the treatment/holding chamber with as much of a forward and sideways direction as possible. These first opening is specifically engineered to a size and location using proprietary calculations that account for flow dynamics, liquid temperature, particle size, structure surface area, and other characteristics of the project/site/etc.

One or more additional openings, called "transition purge openings", may be cut or formed in the inlet/bypass conduit, usually prior to installation of the inlet/bypass conduit into the structure, downstream of the first opening to provide an outlet for trapped hydrocarbons from the inlet conduit into the treatment/holding chamber. These openings are specifically engineering sized and located using proprietary calculations that account for flow dynamics, liquid temperature, particle size, structure surface area, and other characteristics of the project/site/etc. The location and size of the first opening is such that at or above a specified flow rate, the first opening is below the surface elevation of the liquid in the apparatus thus providing hydraulic locking. During times of no-flow into the apparatus, these first opening is above the surface elevation of the liquid in the apparatus.

The end of the bypass conduit, which is in the confluence chamber, is also formed, usually prior to installation of the inlet pipe into the apparatus, to allow an opening for an avenue of excess liquid flow through the apparatus. The location of this opening is usually at the top portion of the inlet conduit end. This opening forms a check dam regulator at the outlet end of the inlet pipe. The check dam regulator is specifically engineering sized and located using proprietary calculations that account for flow dynamics, liquid temperature, particle size, structure surface area, and other characteristics of the project/site/etc. Between the treatment/holding and confluence chambers is a baffle wall with at least one opening formed usually prior to installation of the baffle wall into the structure. These openings are specifically engineered to have a specific size and location using proprietary calculations that account for flow dynamics, liquid temperature, particle size, structure surface area, and other characteristics of the project/site/etc. and allow the primary avenue of flow through the apparatus. A purpose of the baffle wall is to serve as a hydraulic lock to trap and retain floating particulates (e.g., hydrocarbons, etc.). The check dam regulator, the upward slope of the inlet/bypass conduit, the first opening, and the baffle wall openings regulate the flow through the apparatus. Any ancillary treatment will be either a side stream prior to or after the apparatus or full flow prior to or after the apparatus if an ancillary treatment is used.

The second opening may comprise a notch having a height h relative to a bottom surface of the bypass conduit and a width w relative to an end of the bypass conduit. In one aspect, the bypass conduit is angled relative to a horizontal so that a lowest region of the second opening is higher, in relation to the horizontal, than a highest region, such as a top cut 12, of the first opening, such that liquid flow into the inlet, less than a design flow, flows substantially entirely through the first opening. In one aspect, the bypass conduit is angled relative to the horizontal such that a substantial portion of liquid flow into the inlet, above the design flow, flows through the second opening into the second chamber. In one aspect, the first opening comprises a slot in the bypass conduit having an area A sufficient to allow a design flow of the liquid to substantially entirely flow through the first opening.

In one aspect, the first opening defines a scoop in the bypass conduit shaped and configured to direct liquid flow from the inlet against a wall, such as wall 21, of the first chamber. In one aspect, the bypass conduit comprises a third opening, such as transition purge opening 15, located within the first chamber at a height approximately corresponding to a height of the second opening.

It should be understood, of course, that the foregoing relates to exemplary embodiments of the invention and that modifications may be made without departing from the spirit and scope of the invention.

What is claimed is:

1. An apparatus for separating a liquid from other substances, comprising:
   a first chamber;
   a second chamber;
   an inlet connected to the first chamber;
   an outlet connected to the second chamber;
   a bypass conduit passing from the inlet, through the first chamber, and into the second chamber;
   a passage between the first and second chambers and configured to allow the liquid to flow from the first chamber to the second chamber, the passage located below the bypass conduit;
   wherein the bypass conduit comprises a first opening located within the first chamber and a second opening located in the second chamber; and
   wherein the bypass conduit is angled relative to a horizontal so that a lowest region of the second opening is higher, in relation to the horizontal, than a highest region of the first opening, such that liquid flow into the inlet, less than a treatment flow rate, flows substantially entirely through the first opening.

2. The apparatus as claimed in claim 1, wherein the second opening comprises a notch in the bypass conduit, the notch having a height relative to a bottom surface of the bypass conduit and a width relative to an end of the bypass conduit.

3. The apparatus as claimed in claim 1, wherein the bypass conduit is angled relative to a horizontal such that a substantial portion of liquid flow into the inlet, above the treatment flow rate, flows through the second opening into the second chamber.

4. The apparatus as claimed in claim 1, wherein the first opening comprises a slot in the bypass conduit having an area sufficient to allow a treatment flow rate of the liquid to substantially entirely flow through the first opening.

5. The apparatus as claimed in claim 4, wherein the first opening defines a scoop in the bypass conduit shaped and configured to direct liquid flow from the inlet into the first chamber.

6. The apparatus as claimed in claim 1, wherein the bypass conduit comprises a third opening located within the first chamber at a height approximately corresponding to a height of the second opening.

7. The apparatus as claimed in claim 1, wherein the inlet, the bypass conduit, and the first and second openings are integrally formed.

8. An apparatus for separating a liquid from other substances, comprising:
   a first chamber;
   a second chamber;
   an inlet connected to the first chamber;
   an outlet connected to the second chamber;
   a bypass conduit passing from the inlet, through the first chamber, and into the second chamber;
   a passage between the first and second chambers and configured to allow the liquid to flow from the first chamber to the second chamber, the passage located below the bypass conduit,
   wherein the bypass conduit comprises a first opening located within the first chamber and a second opening located in the second chamber,
   wherein the second opening comprises a notch in the bypass conduit, the notch having a height relative to a bottom surface of the bypass conduit and a
   width relative to an end of the bypass conduit,
   wherein the bypass conduit is angled at an angle relative to a horizontal so that a lowest region of the notch is higher, in relation to the horizontal, than a highest region of the first opening, such that liquid flow into the inlet, less than a treatment flow rate, flows substantially entirely through the first opening, and
   wherein the first opening comprises a slot in the bypass conduit having an area sufficient to allow liquid flow into the inlet, less than the treatment flow rate, to substantially entirely flow through the first opening.

9. A method of separating a liquid from other substances, comprising:
   providing the apparatus as claimed in claim 8;
   providing a mixture of the liquid and other substances into the inlet; and directing the liquid from the outlet.

10. The method as claimed in claim 9, further comprising adjusting the angle of the bypass conduit to adjust the treatment flow rate.

11. The method as claimed in claim 9, further comprising adjusting at least one of the height and the width of the notch to adjust the treatment flow rate.

12. The method as claimed in claim 9, further comprising adjusting the angle of the bypass conduit and the height and the width of the notch to adjust the treatment flow rate.

13. An apparatus for separating floating and non-floating matter from liquid and for separating liquids from liquids with a different density, the apparatus comprising:
   one or more structures divided such that the apparatus comprises a plurality of internal chambers;
   at least one inlet conduit that passes all the way through at least one chamber, but not all chambers, and terminates within one of the chambers, the conduit having at least one opening in each of the internal chambers;
   a passageway between the internal chambers below the conduit to simultaneously allow liquid to pass between the internal chambers and to prevent floatable matter from passing between chambers; and
   the first opening in the first internal chamber for the passage of liquid out of the conduit, first opening comprising a shape that wraps generally around the bottom and sides of the conduit but not the top and the first opening is shorter, relative to the axis of the conduit, at the bottom than on the sides so as to allow flow to exit the conduit in all horizontal and downward directions, but minimizing the average downward component of the velocity of this flow.

14. The apparatus of claim 13 wherein the terminal end of the conduit is sealed and some length of the top portion of the sealed end of the conduit is removed to create a second opening and a check dam regulator.

15. The apparatus of claim 13 wherein floating matter in the conduit is purged through the flushing action of incoming liquid prior to the openings becoming hydraulically locked.

16. The apparatus of claim 13 wherein the first opening is cut into the conduit adjacent to, but in the first internal chamber and upstream of a second opening comprising a check dam regulator, the top of the first opening set below the elevation of the second opening and the check dam regulator for purging of floatable matter trapped within the conduit prior to liquid level rising above the top of the second opening and the check dam regulator.

17. The apparatus of claim 13 wherein the conduit takes on a rising slope while inside the internal chambers so as to raise the elevation of a check dam regulator without raising the check dam regulator relative to the invert of the terminal end of the conduit.

18. The apparatus of claim 13 wherein the conduit is configured so as to utilize the Bernoulli Effect to balance the flow of the liquid between and through the first internal chamber and the inlet conduit.

19. The apparatus of claim 13 wherein the first opening is cut into the conduit in the first internal chamber and adjacent to a baffle wall, the top of the first opening set below the elevation of the second opening and the check dam regulator, wherein the first opening and all substantial openings upstream of the second opening are designed to hydraulically lock during flows sufficient to raise the liquid level within the conduit to the level of the second opening so as to prevent previously captured floatable matter from escaping from the first internal chamber.

20. The apparatus of claim 13 wherein the elevation of the second opening and the combined hydraulic loss of the first opening are balanced such that at a specified treatment flow rate the liquid level in the conduit reaches the elevation of the second opening and liquid exits the conduit through the second opening at any higher flow rate, but not at a lower flow rate.

* * * * *